Sept. 2, 1952  W. R. CHAPIN  2,609,017
CIRCULAR SAW BLADE WITH TENSION STABILIZING HOLES
Filed March 13, 1950
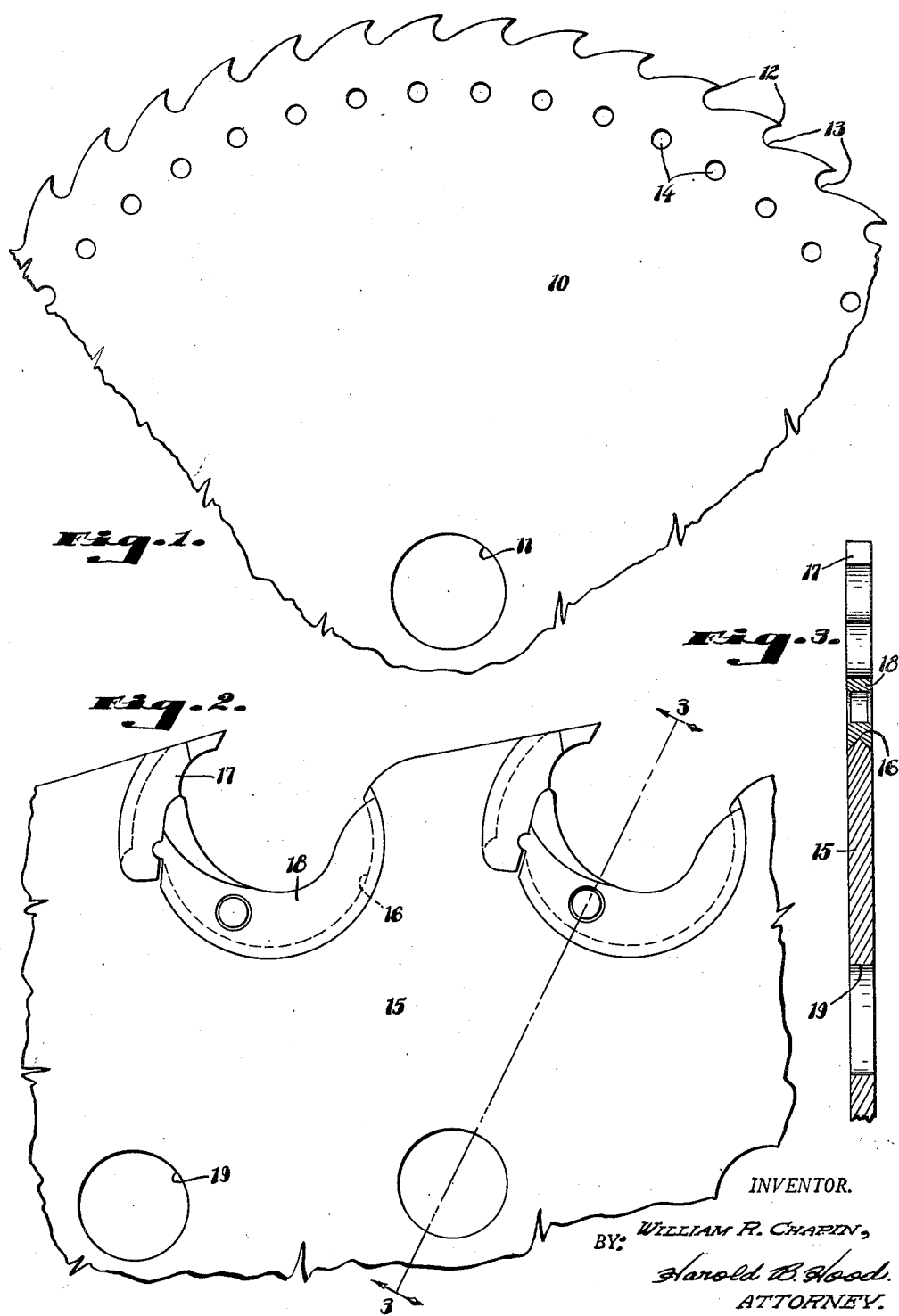
INVENTOR.
BY: WILLIAM R. CHAPIN,
Harold B. Hood.
ATTORNEY.

Patented Sept. 2, 1952

2,609,017

UNITED STATES PATENT OFFICE 2,609,017

CIRCULAR SAW BLADE WITH TENSION STABILIZING HOLES

William R. Chapin, Indianapolis, Ind., assignor to E. C. Atkins and Company, Indianapolis, Ind., a corporation of Indiana Application March 13, 1950, Serial No. 149,335

2 Claims. (Cl. 143—137)

The present invention relates to circular saw blades, and is particularly concerned with an improvement therein which, while structurally simple and theoretically insignificant, nevertheless produces astounding improvements in the action of such blades, in use. The invention presently appears to be substantially equally adaptable to all types of circular saws including solid tooth, inserted tooth, and tipped tooth saws.

The primary object of the invention is to improve the operation of circular saw blades. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a fragmentary elevation of a circular saw blade embodying my invention;

Fig. 2 is an enlarged fragmentary elevation of a circular saw blade of the inserted-tooth type, embodying my invention; and Fig. 3 is a section taken substantially on the line 3, 3 of Fig. 2.

The manufacture of circular saw blades, particularly of the larger sizes, involves the step of "tensioning" the blade; and that step, being an art which is dependent upon the skill of the individual craftsman, adds very substantially to the cost of manufacture of the blade. Furthermore, the desgree of skill exercised by the craftsman in carrying out that step determines, to a very substantial extent, the efficiency and effectiveness of the blade in use.

Roughly stated "tensioning" consists in hand forging a flat blade to a dished or concavo-convex shape of just the right degree so that, when the blade is subsequently driven, at selected velocity for performing its intended work, centrifugal force will strain the blade from its dished condition of equilibrium into accurate flatness. If the blade is plane, when in static equilibrium, its peripheral region will tend, as a result of stresses exerted thereagainst by the work, and of other stresses, to "weave" from side to side out of the plane of the blade during operation.

Inevitably, craftsmen of varying degrees of skill will produce saw blades variously tensioned, so that absolute uniformity in this characteristic is not attainable.

I have discovered that, if a series of perforations, of properly selected dimensions, and properly radially and angularly related to the teeth of a saw, is formed upon a circle concentric with the saw teeth and in staggered relation to the teeth, the action of a circular saw blade in use is materially improved. While I am not able certainly to state all of the reasons for that improvement, or even all of the characteristics in which the blade action is improved, I presently believe that the following improvements result from the provision of such a series of perforations.

A. The rapidly rotating series of axially-extending perforations will produce a fan effect causing circulation of air not only in a peripheral direction but also between the opposite sides of the saw blade, tending to cool the rim of the saw, to blow sawdust out of the kerf being formed, to prevent adherence of sawdust to the blade, and to keep the blade clean and in balance.

B. The perforations relieve tension in the peripheral region of the saw radially beyond the series of perforations, thereby tending to equalize the degree of tension thereof in a peripheral direction and to relieve the body of the saw of tension inequalities arising in the rim region because of contact of the teeth with the work or otherwise.

C. In an inserted-tooth type of saw blade, the perforations relieve inequalities in tension or compression in a peripheral direction produced by minute variations in the size of the sockets or of the teeth and holders.

D. Presumably because of the effects defined under items B and C, I find that a blade, constructed in accordance with the present invention, will hold its predetermined tension over a longer period of use than is found possible in conventional blades.

E. The perforations equalize air pressure on the opposite sides of the blade, as it runs in a kerf, thereby preventing deflection of the blade as a result of unequal pressures.

F. Because the perforations are equal in number to the teeth of the saw and peripherally staggered relative thereto, the perforations provide stress relief for the individual teeth almost independently.

In Fig. 1, I have shown a fragment of a conventional circular saw 10 which, in the illustrated embodiment of the invention, is provided with a central perforation 11 for mounting the saw on a spindle. The body 10 is provided with a peripheral series of teeth 12 separated by conventional gullets 13.

A series of perforations 14 is formed, according to the present invention, in a circular rank, the centers of all of the perforations being located upon a common circle concentric with the common circle in which the tips of the teeth 12 are located. Adjacent perforations of the series are angularly spaced from each other to a degree equal to the angular spacing between the teeth 12; but said perforations are staggered relative to the teeth tips so that a radius of the blade, drawn through the center of any perforation will substantially bisect the peripheral dimension of its associated tooth, as measured upon an arc concentric with the blade and terminating in blade radii touching the tip of the tooth and the trailing end of its root, respectively. The "trailing end of its root" may be defined as that point on the back surface of a tooth intersected by a radius of its corresponding perforation drawn to the tip of the next following tooth. The perforations are so located that, as the gullets 13 are inwardly extended during sharpening after wear, each gullet will eventually "grow" into one of the perforations 14. The common circle containing the centers of the perforations 14 will be located as close to the bases of the gullets 13 as may be conveniently possible, but far enough therefrom to clear a saw guide with which the blade may be associated in operation. The diameters of the perforations will be such that the peripheral dimension between adjacent borders of adjacent perforations will somewhat exceed the peripheral dimension of the body of each tooth 12, measured as described above.

The blade may be tensioned before or after the formation of the perforations 14; but I prefer to tension the body portion of the blade, radially inwardly disposed relative to the circle common to the centers of the perforations, after the perforations have been formed. The peripheral region of the blade beyond that circle may, if desired, be similarly tensioned; but I presently believe that it will be preferable merely to flatten that peripheral region, without making any effort to bring the peripheral region of the blade into concavo-convex coincidence with the body portion thereof.

In Figs. 2 and 3, I have shown a fragment of an inserted-tooth type blade 15 provided with a peripheral series of outwardly-opening sockets 16, in each of which is received a tooth 17 and a wedge-type holder 18. A series of perforations 19 is formed in the blade 15, said perforations bearing, to the sockets 16 and teeth 17, a relation closely similar to that of the perforations 14 to the teeth 12 and gullets 13.

The performance of a saw constructed in accordance with the invention, in use, is in many respects amazing. The rim or peripheral region of such a saw will sometimes weave heavily, as the saw spins freely; but the moment the saw is brought into contact with work, that motion of the rim is immediately arrested, and the rim runs true, forming a perfect kerf, for so long as it is in contact with the work. In one instance, a conventionally constructed saw blade of large diameter was returned by the purchaser as unusable because the rim, although the saw had been tensioned in accordance with standard practice, could not be made to run even reasonably in a true plane. The returned saw was thereupon provided with perforations in accordance with the present disclosure and, without further modification, the saw was delivered again to the purchaser. As modified, the saw performs so perfectly that the purchaser has been unwilling to release it to the manufacturer, even temporarily for the purpose of conducting further tests.

I claim as my invention:

1. A circular saw perforated at its central region for mounting on a spindle, and provided with a peripheral series of teeth, said saw being otherwise unperforated except for a single series of perforations of uniform dimensions arranged in a circular rank concentric with said teeth, the angular spacing between the centers of adjacent perforations of the series being equal to the angular spacing between adjacent teeth, but the perforations being staggered relative to the teeth.

2. A circular saw of the inserted-tooth type having a peripheral series of outwardly-opening sockets, and a tooth and a holder therefor wedged into each socket, said saw being formed at its center for mounting on a spindle and being otherwise unperforated except for a single series of perforations arranged in a circular rank concentric with said socket, the angular spacing between adjacent perforations of the series being equal to the angular spacing between adjacent sockets, and the perforations being staggered relative to the sockets.

WILLIAM R. CHAPIN.

REFERENCES CITED

The following references are of record in the file of this patent:

UNITED STATES PATENTS

| Number | Name | Date |
|--------|------|------|
| 88,949 | Emerson | Apr. 13, 1869 |
| 2,277,550 | Johnson | Mar. 24, 1942 |

FOREIGN PATENTS

| Number | Country | Date |
|--------|---------|------|
| 66,553 | Switzerland | May 6, 1914 |